(12) United States Patent
Tahara

(10) Patent No.: US 10,663,288 B2
(45) Date of Patent: May 26, 2020

(54) SHAPE MEASURING APPARATUS AND SHAPE MEASURING METHOD USING MATCHED FREQUENCY MEASURING LIGHT

(71) Applicant: KOBELCO RESEARCH INSTITUTE, INC., Kobe-shi (JP)

(72) Inventor: Kazuhiko Tahara, Kobe (JP)

(73) Assignee: KOBELCO RESEARCH INSTITUTE, INC., Kobe-shi (JP)

( * ) Notice: Subject to any disclaimer, the term of this patent is extended or adjusted under 35 U.S.C. 154(b) by 0 days.

(21) Appl. No.: 16/274,345

(22) Filed: Feb. 13, 2019

(65) Prior Publication Data

US 2019/0293407 A1 Sep. 26, 2019

(30) Foreign Application Priority Data

Mar. 23, 2018 (JP) ................. 2018-056565

(51) Int. Cl.
| | |
|---|---|
| *G01B 11/06* | (2006.01) |
| *G01B 9/02* | (2006.01) |
| *H04B 10/64* | (2013.01) |
| *G02B 27/28* | (2006.01) |
| *G01B 11/24* | (2006.01) |

(52) U.S. Cl.
CPC ...... *G01B 11/0675* (2013.01); *G01B 9/02002* (2013.01); *G01B 9/02021* (2013.01); *G01B 9/02027* (2013.01); *G01B 11/2441* (2013.01); *G02B 27/283* (2013.01); *H04B 10/64* (2013.01); *G01B 2290/70* (2013.01)

(58) Field of Classification Search
CPC ............... G01B 11/06; G01B 9/02027; G01B 2290/70; G01B 2210/48; G01B 2210/56; G01B 11/0675; G01B 11/2441; G01L 39/02021; G01L 39/02002; H04B 10/64; G02B 27/283

See application file for complete search history.

(56) References Cited

U.S. PATENT DOCUMENTS

| | | | |
|---|---|---|---|
| 2011/0279822 A1 | 11/2011 | Kannaka et al. | |
| 2012/0002213 A1* | 1/2012 | Kannaka | G01B 11/0608 356/492 |
| 2013/0235386 A1* | 9/2013 | Osawa | G01B 11/2441 356/511 |

(Continued)

*Primary Examiner* — Michael P LaPage
(74) *Attorney, Agent, or Firm* — Oblon, McClelland, Maier & Neustadt, L.L.P.

(57) ABSTRACT

A shape measuring apparatus of the present invention measures a variation in a thickness of an object to be measured WA based on an A surface reference interference light and an A surface measuring interference light obtained by performing optical heterodyne interference on a first A surface measuring light and a second A surface measuring light and a B surface reference interference light and a B surface measuring interference light obtained by performing the optical heterodyne interference on a first B surface measuring light and a second B surface measuring light. When the optical heterodyne interference is performed, the shape measuring apparatus makes the first A surface measuring light and the second B surface measuring light equal in frequency and makes the first B surface measuring light and the second A surface measuring light equal in frequency.

5 Claims, 8 Drawing Sheets

(56) References Cited

U.S. PATENT DOCUMENTS

| | | | |
|---|---|---|---|
| 2015/0070710 A1* | 3/2015 | Osawa | G01B 11/2441 356/508 |
| 2017/0284788 A1* | 10/2017 | Kannaka | G01B 11/2441 |
| 2020/0011654 A1* | 1/2020 | Safrani | G01B 9/02027 |

* cited by examiner

SHAPE MEASURING APPARATUS AND SHAPE MEASURING METHOD USING MATCHED FREQUENCY MEASURING LIGHT

CROSS-REFERENCE TO RELATED APPLICATION

This application claims priority of Japanese Patent Application No. 2018-056565 filed on Mar. 23, 2018, the entire disclosure of which is incorporated herein by reference.

BACKGROUND OF THE INVENTION

1. Field of the Invention

The present invention relates to a shape measuring apparatus that measures a variation in a thickness of an object to be measured such as a semiconductor wafer based on an optical heterodyne interference method, and a shape measuring method.

2. Description of the Background Art

In recent years, integration of elements is being heightened in an integrated circuit. A processing rule that is a processing condition for manufacturing the integrated circuit on a semiconductor wafer is normally defined by a minimum processing size in a line width or an interval of gate wires. If this processing rule becomes half, theoretically quadruple numbers of transistors and wires can be disposed without increasing an area of a disposing space, and thus the area becomes ¼ for the same number of transistors. As a result, a quadplex number of dies can be manufactured from one semiconductor wafer, and also yield is normally improved. For this reason, a greater number of dies can be manufactured. This minimum processing size reaches a maximum of 14 nm in 2015 in order to manufacture a high-density integrated circuit.

In such a sub-micron meter-order (equal to or less than 1 μm) processing rule, high flatness is required for a semiconductor wafer, and thus a shape, such as a change in a height of a surface, of the semiconductor wafer cannot be ignored. For this reason, a shape measuring apparatus that measures a shape of a semiconductor wafer accurately, for example, by a sub-nanometer order (equal to or less than 1 nm) is desired. As one of such a shape measuring apparatus, a device that measures a shape of an object to be measured according to the optical heterodyne interference method is known (for example, see Japanese Patent Application Laid-Open No. 2010-175499 (D1)). In the optical heterodyne interference method, two laser beams having different frequencies are caused to interfere with each other so that a beat signal having a frequency of the difference between the frequencies is generated, and a phase change of the generated beat signal is detected. The phase change of the beat signal corresponds to a difference in an optical path between the two laser beams, and thus relates to a variation in a thickness of the object to be measured.

As described above, in the optical heterodyne interference method, two laser beams having different frequencies are required. For this reason, a Zeeman laser that outputs two laser beams having different frequencies from an identical optical axis, or a frequency stabilization laser is used, and a frequency of a laser beam to be output from such a laser is modulated by an acousto-optical modulator (AOM) or the like, so that two laser beams having different frequencies are generated. In such a method, in some cases, noises that are generated in a circuit that generates an electric field in order to obtain a Zeeman effect, a circuit that stabilizes a frequency, and a circuit for pumping, and noises that intrudes into these circuits from outside are included in frequency components of the two laser beams having different frequencies. As a result, measured values may include noises.

A so-called lock-in amplifier is used for detecting a phase in the optical heterodyne interference method, but the noises might become frequencies that cannot be removed even by a low-pass filter configuring the lock-in amplifier.

SUMMARY OF THE INVENTION

The present invention is devised in order to solve the above issue, and its object is to provide a shape measuring apparatus that can reduce a noise, and a shape measuring method.

In a shape measuring apparatus and a shape measuring method of the present invention, a variation in a thickness of an object to be measured is measured based on an A surface reference interference light and an A surface measuring interference light obtained by performing optical heterodyne interference on a first A surface measuring light and a second A surface measuring light and a B surface reference interference light and a B surface measuring interference light obtained by performing the optical heterodyne interference on a first B surface measuring light and a second B surface measuring light, and when the optical heterodyne interference is performed, the first A surface measuring light and the second B surface measuring light are made to be equal in frequency and the first B surface measuring light and the second A surface measuring light are made to be equal in frequency.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 1:
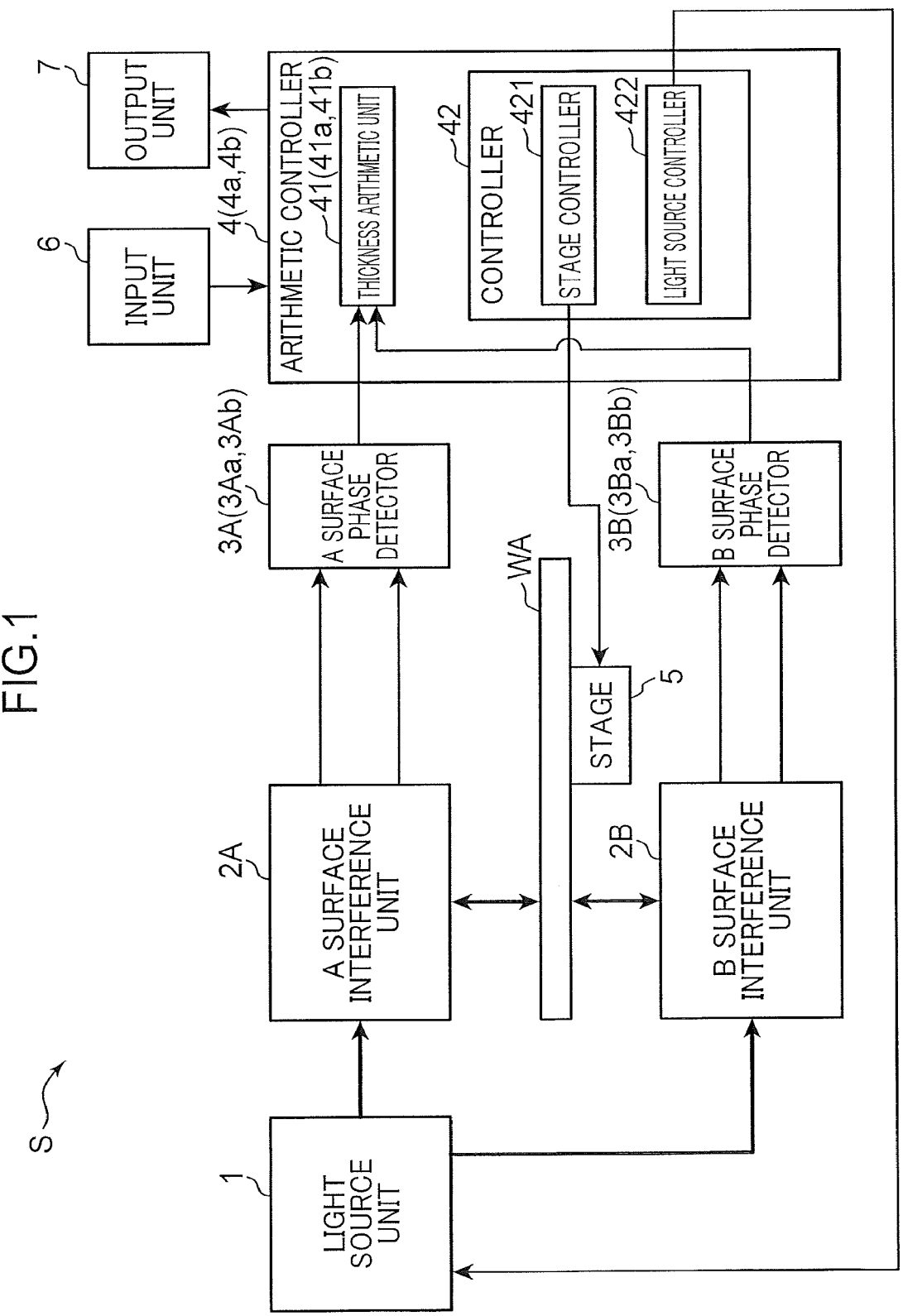
FIG. 1 is a block diagram illustrating a configuration of a shape measuring apparatus according to an exemplary embodiment.

One or a plurality of exemplary embodiments of the present invention will be described below with reference to the drawings. However, the scope of the present invention is not limited to the disclosed exemplary embodiments. Components denoted by identical symbols in the drawings are identical components, and description thereof is appropriately omitted. In this specification, when the components are collectively referred to, the components are denoted by reference symbols without additional alphabets, and when the components are individually referred to, the components are denoted by reference symbols with additional alphabets.

A shape measuring apparatus according to the exemplary embodiments is a device that measures a variation in a thickness of a thin plate-shaped object to be measured WA such as a semiconductor wafer using an optical heterodyne interference method in, for example, nanometer or sub-nanometer (resolution in a direction of a thickness equal to or less than 1 nm) in a non-contact manner. Such a shape measuring apparatus according to the present exemplary embodiment includes a light source unit, an optical branching device, an A surface interference unit, a B surface interference unit, and a shape measuring device. The light source unit generates a measuring light. The optical branching device branches the measuring light generated by the light source unit into an A surface measuring light and a B surface measuring light. The A surface interference unit generates an A surface measuring interference light and an A surface reference interference light. The A surface measuring interference light is generated by further branching the A surface measuring light branched by the optical branching device into a first A surface measuring light and a second A surface measuring light and by causing a post-emission A surface measuring light emitted to and reflected from a portion of a first measurement position on one surface of an object to be measured in the first A surface measuring light to interfere with the second A surface measuring light through optical heterodyne interference. The A surface reference interference light is generated by causing a pre-emission A surface measuring light before emission to the portion of the first measurement position in the first A surface measuring light to interfere with the second A surface measuring light through the optical heterodyne interference. The B surface interference unit generates a B surface measuring interference light and a B surface reference interference light. The B surface measuring interference light is generated by further branching the B surface measuring light branched by the optical branching device into a first B surface measuring light and a second B surface measuring light and by causing a post-emission B surface measuring light emitted to and reflected from a portion of a second measurement position opposing the portion of the first measurement position on the other surface of the object to be measured in the first B surface measuring light to interfere with the second B surface measuring light through the optical heterodyne interference. The B surface reference interference light is generated by causing a pre-emission B surface measuring light before emission to the portion of the second measurement position in the first B surface measuring light to interfere with the second B surface measuring light through the optical heterodyne interference. The shape measuring device obtains a variation in a thickness of the object to be measured based on a first phase obtained by detecting phases of the A surface measuring interference light and the A surface reference interference light generated by the A surface interference unit and a second phase obtained by detecting phases of the B surface measuring interference light and the B surface reference interference light generated by the B surface interference unit. In the present exemplary embodiment, the A surface interference unit and the B surface interference unit make the first A surface measuring light and the second B surface measuring light equal in frequency and make, at a time of the optical heterodyne interference, the first B surface measuring light and the second A surface measuring light equal in frequency. More specifically, the shape measuring apparatus will be described below.

FIG. 1 is a block diagram illustrating a configuration of the shape measuring apparatus according to the exemplary embodiment. A shape measuring apparatus S includes, for example, as illustrated in FIG. 1, a light source unit 1, an A surface interference unit 2A, a B surface interference unit 2B, an A surface phase detector 3A (3Aa), a B surface phase detector 3B (3Ba), an arithmetic controller 4 (4a), a stage 5, an input unit 6, and an output unit 7. The shape measuring apparatus S moves an object to be measured WA in a horizontal direction through the stage 5 and simultaneously measures a variation in a thickness of the object to be measured WA.

Respective units of the shape measuring apparatus S will be described below, and also optical parts (optical elements) to be used a lot in the respective units will be collectively described.

The optical branching device (a non-polarizing beam splitter) is an optical part that branches an incident light into two lights at optical power points and emits the two lights. Examples of the optical branching device are a micro optical element-type optical branching and coupling device such as a half mirror (a semitransparent mirror), an optical fiber-type optical branching and coupling device of a fused fiber, and an optical waveguide-type optical branching and coupling device. The optical branching device normally functions as an optical coupling device that combines two incident lights to emit a combined light when an input terminal and an output terminal are reversed to be used. When the half mirror is used as the optical branching device, normally one of branched lights passes through the half mirror to be emitted in a straight direction, and the other one of the branched lights is reflected from the half mirror to be emitted in a direction vertical (orthogonal) to the straight direction.

A polarization beam splitter is an optical part that takes out an S-polarized light and a P-polarized light that are orthogonal to each other from the incident light and emits them, normally emits one of the taken lights (the S-polarized light or the P-polarized light) in a straight direction, and emits the other one of the taken lights (the P-polarized light or the S-polarized light) in a direction vertical (orthogonal) to the straight direction.

A polarizer is an optical part such as a polarization filter that takes out a linear polarization light having a predetermined polarization surface from the incident light and emits the linear polarization light.

A wave plate (a phase plate) is an optical part that gives a predetermined phase difference between two polarization components of the incident light (therefore, an optical path difference). Examples of the wave plate are a ¼ wave plate that give an optical path difference of $\lambda/4$ between the two polarization components of the incident light, and a ½ wave plate that give an optical path difference of $\lambda/2$ between the two polarization components of the incident light. Herein, $\lambda$ represents a wavelength of the incident light.

A reflection mirror is an optical part that reflects the incident light at a reflection angle based on an incident angle of the incident light with a predetermined reflectivity so as to change an advancing direction of the light. The reflection mirror is obtained by, for example, evaporating a metallic thin film or a dielectric multi-layer film onto a surface of a glass member. The reflection mirror is preferably a total reflection mirror that performs total reflection in order to reduce a loss of light.

The input terminal is a terminal for incidence of a light to the optical parts, and the output terminal is a terminal for emission of a light from the optical parts. A light guiding unit configured by an optical part such as a mirror or a lens may be used for connection among the units, but in the present exemplary embodiment, optical fibers such as polarization maintaining optical fibers are used for connection among the units as described later. For this reason, connectors for connecting the optical fibers are used as the input terminal and the output terminal.

Figure 2:
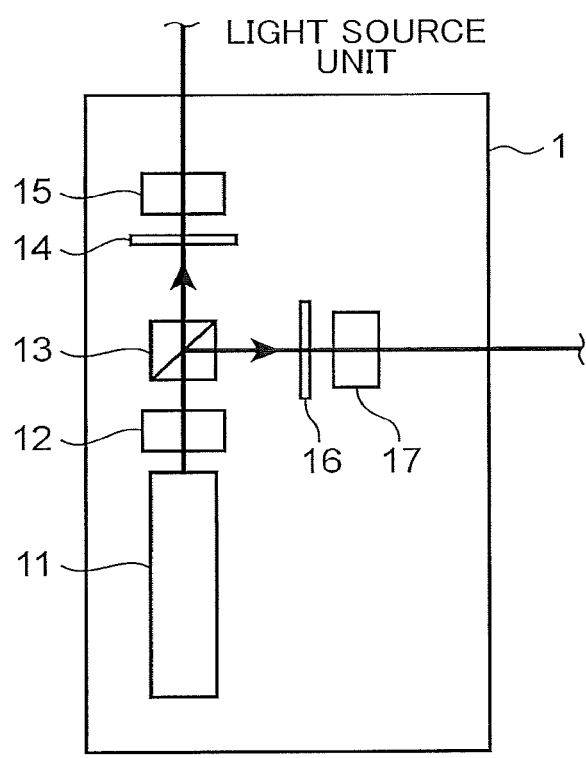
FIG. 2 is a diagram illustrating a configuration of a light source unit in the shape measuring apparatus.

The respective units of the shape measuring apparatus S will be described below. First, the light source unit 1 will be described. FIG. 2 is a diagram illustrating a configuration of the light source unit in the shape measuring apparatus. The light source unit 1 is a unit that generates a measuring light that is predetermined coherent light for measuring a variation in a thickness of the object to be measured WA according to the optical heterodyne interference method. The measuring light is a single wavelength light having a predetermined wavelength λ (a frequency ω) that has been preset, and a polarization light having a predetermined polarization surface that has been preset. The measuring light has two measuring lights including an A surface measuring light and a B surface measuring light for measuring the object to be measured WA from both surfaces by using the optical heterodyne interference method. Note that, for convenience of the description, one surface (one main surface) of the object to be measured WA is referred to as an A surface, and the other surface (the other main surface), the other surface being in a front-rear relationship with respect to the one surface, of the object to be measured WA is referred to as a B surface. Such light source unit 1 includes, for example, as illustrated in FIG. 2, a single wavelength laser beam source 11, an optical isolator 12, an optical branching device 13, polarizers 14, 16, and output terminals 15, 17.

The single wavelength laser beam source 11 is a device that generates a single wavelength laser beam having a predetermined wavelength λ0 (a frequency ω0) that has been preset. As the single wavelength laser beam source 11, various kinds of lasers, such as a helium-neon gas laser (a He—Ne gas laser) that can output a laser beam having a wavelength of about 632.8 nm with a predetermined optical power. As the single wavelength laser beam source 11, a so-called frequency stabilizing gas laser that has a wavelength locker is preferable. The single wavelength laser beam source 11 may be a semiconductor laser.

The optical isolator 12 is an optical part that causes a light to transmit only in one direction from the input terminal to the output terminal. The optical isolator 12 prevents a reflection light (a return light) generated at connecting portions of the optical parts (the optical elements) in the shape measuring apparatus S to enter the single wavelength laser beam source 11 in order to stabilize laser oscillation of the single wavelength laser beam source 11.

In the light source unit 1, a laser beam emitted from the single wavelength laser beam source 11 enters the optical branching device 13 via the optical isolator 12 and is distributed into two beams including a first laser beam and a second laser beam. The first laser beam enters the polarizer 14 and becomes an A surface measuring light of the laser beam having a predetermined polarization surface so as to be emitted from the output terminal 15. The A surface measuring light enters the A surface interference unit 2A. On the other hand, the second laser beam enters the polarizer 16, and becomes a B surface measuring light of the laser beam having a predetermined polarization surface so as to be emitted from the output terminal 17. The B surface measuring light enters the B surface interference unit 2B. In the present exemplary embodiment, the A surface measuring light is used for measuring the A surface of the object to be measured WA through the optical heterodyne interference method, and the B surface measuring light is used for measuring the B surface of the object to be measured WA according to the optical heterodyne interference method.

From a viewpoint that a length of an optical path between the light source unit 1 and the A surface interference unit 2A, and a length of an optical path between the light source unit 1 and the B surface interference unit 2B can be easily adjusted, in the present exemplary embodiment, polarization maintaining optical fibers that guide a light while their polarization surfaces are being maintained are used for connection between the light source unit 1 and the A surface interference unit 2A and connection between the light source unit 1 and the B surface interference unit 2B, respectively. Examples of the polarization maintaining optical fibers are polarization maintaining and absorption reducing (PANDA) fibers and ellipsoidal core optical fibers. An A surface measuring light emitted from the output terminal 15 of the light source unit 1 is guided by the polarization maintaining optical fiber, and enters the A surface interference unit 2A. A "B" surface measuring light emitted from the output terminal 17 of the light source unit 1 is guided by the polarization maintaining optical fiber, and enters the B surface interference unit 2B.

Figure 3:
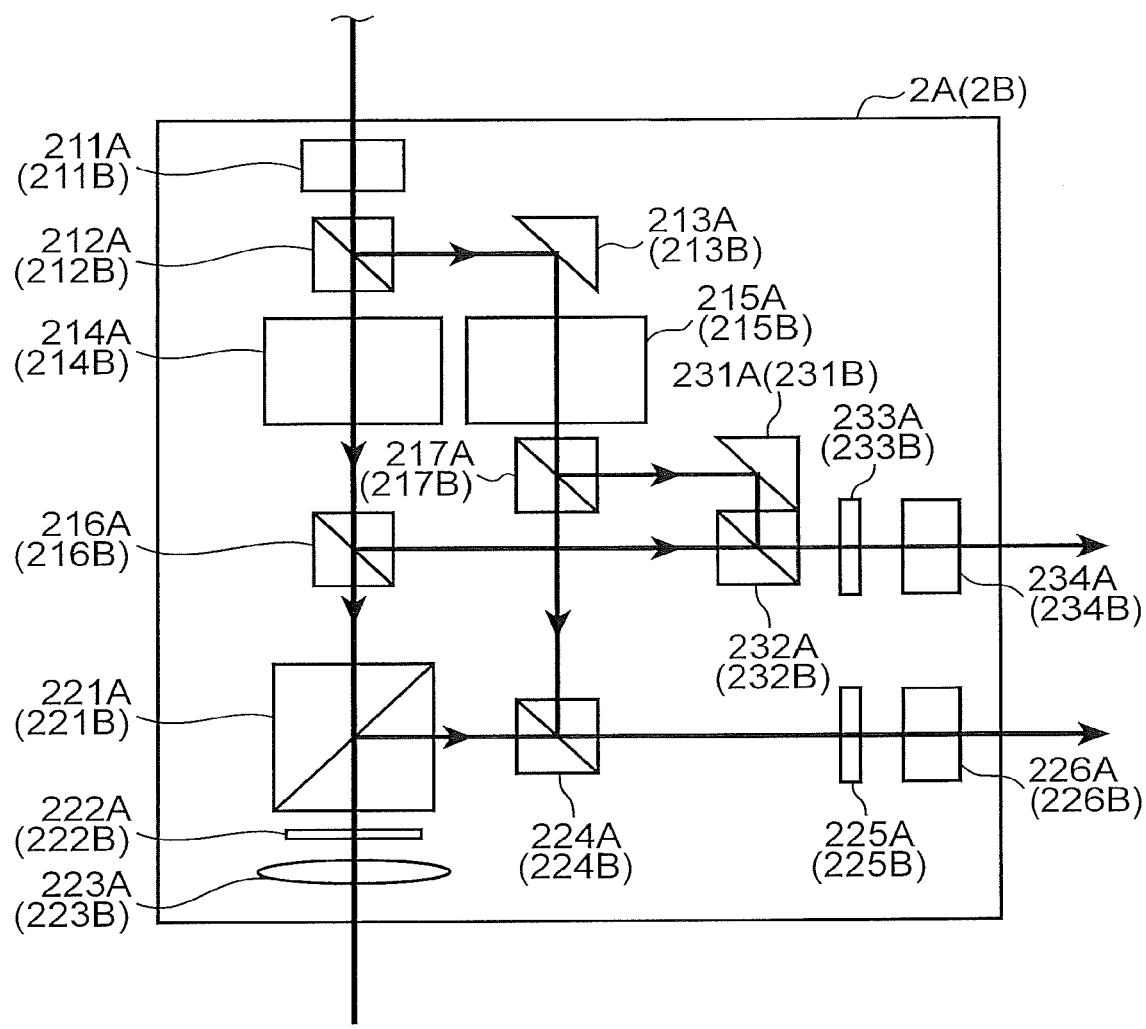
FIG. 3 is a diagram illustrating a configuration of an A surface interference unit (a B surface interference) in the shape measuring apparatus.

The A surface interference unit 2A and the B surface interference unit 2B will be described below. FIG. 3 is a diagram illustrating a configuration of the A surface interference unit (the B surface interference unit) in the shape measuring apparatus. Note that since the A surface interference unit 2A and the B surface interference unit 2B have identical configurations, the A surface interference unit 2A will be mainly described below. The reference symbols given to the components of the B surface interference unit 2B corresponding to the components of the A surface interference unit 2A are given into parenthesis after the reference symbols given to the components of the A surface interference unit 2A. When the components of the B surface interference unit 2B are described, the "A surface" is changed into the "B surface". For this reason, FIG. 3 illustrates mainly the components of the A surface interference unit 2A, and the components of the B surface interference unit 2B are illustrated in FIG. 3 by indicating the reference symbols in parentheses given to the components of the B surface interference unit 2B.

The A surface interference unit 2A (2B) is a unit that receives an A surface measuring light from the light source unit 1 and obtains a beat light signal including information about a variation in the thickness of the object to be measured WA on the A surface using in the optical heterodyne interference method using the A surface measuring light.

More specifically, the A surface interference unit 2A (2B) is a measurement optical system disposed to oppose the A surface of the object to be measured WA. The A surface interference unit 2A (2B) generates A surface measuring interference light by further branching the A surface measuring light from the light source unit 1 into a first A surface measuring light and a second A surface measuring light and by causing a post-emission A surface measuring light emitted to and reflected from a portion of a first measurement position on the A surface of the object to be measured WA in the first A surface measuring light to interfere with the second A surface measuring light through the optical heterodyne interference. The A surface interference unit 2A (2B) generates A surface reference interference light by causing a pre-emission A surface measuring light before emission to the portion of the first measurement position in the first A surface measuring light to interfere with the second A surface measuring light through the optical heterodyne interference. The A surface interference unit 2A (2B) having such a configuration obtains information representing a phase of the A surface measuring interference light based on the A surface reference interference light.

In other words, the A surface interference unit 2A (2B) is an optical heterodyne interferometer disposed to oppose the A surface of the object to be measured WA. The A surface interference unit 2A (2B) generates a first A surface measuring light and a second A surface measuring light having different frequencies from the A surface measuring light, and causes the first A surface measuring light and the second A surface measuring light to interfere with each other (the optical heterodyne interference) so as to generate a beat light signal having a frequency of a difference therebetween. The A surface interference unit 2A (2B) is a measurement optical system that includes a first A surface optical path where the first A surface measuring light is emitted to and reflected from the A surface of the object to be measured WA during the generation of the first A surface measuring light and the second A surface measuring light from the A surface measuring light through the interference between the first A surface measuring light and the second A surface measuring light, and a second A surface optical path where the first A surface measuring light is not emitted to the A surface of the object to be measured WA.

The A surface interference unit 2A (2B) includes, for example, as illustrated in FIG. 3, an input terminal 211A (211B), optical branching devices 212A (212B), 216A (216B), 217A (217B), 224A (224B), 232A (232B), a polarization beam splitter 221A (221B), light modulators 214A (214B), 215A (215B), reflection mirrors 213A (213B), 231A (231B), a ¼ wave plate 222A (222B), a lens 223A (223B), polarizers 225A (225B), 233A (233B), and output terminals 226A (226B), 234A (234B). The light modulators 214A (214B), 215A (215B), the polarization beam splitter 221A (221B), the ¼ wave plate 222A (222B), the lens 223A (223B), the optical branching device 224A (224B), the polarizer 225A (225B), and the output terminal 226A (226B) configure a measurement interferometer that generates the A surface measuring interference light. The light modulators 214A (214B), 215A (215B), the optical branching devices 212A (212B), 216A (216B), 217A (217B), 232A (232B), the reflection mirror 231A (231B), the polarizer 233A (233B), and the output terminal 234A (234B) configure a reference interferometer that generates the A surface reference interference light.

The light modulators 214A (214B), 215A (215B) are optical parts that modulate an incident light with a predetermined frequency, and for example, acousto-optical modulators (AOM) that modulate an incident light using an acousto-optical effect are used. The lens 223A (223B) is an objective lens of the A surface interference unit 2A (2B) with respect to the object to be measured WA, and is, for example, an aspherical condensing lens.

In the A surface interference unit 2A (2B), the A surface measuring light that has entered the input terminal 211A (211B) from the light source unit 1 via the polarization maintaining optical fiber enters the optical branching device 212A (212B) to be branched into the first A surface measuring light and the second A surface measuring light. The first A surface measuring light advances in a straight direction (in the optical branching device 212A (212B), an advancing direction of the incident light is identical to an advancing direction of the emitted light), whereas the second A surface measuring light advances in a direction orthogonal (vertical) to the advancing direction of the first A surface measuring light. The first A surface measuring light emitted from the optical branching device 212A (212B) enters the light modulator 214A (214B), and its wavelength (frequency) is modulated at a predetermined first frequency fA1. The second A surface measuring light emitted from the optical branching device 212A (212B) enters the light modulator 215A (215B) via the reflection mirror 213A (213B), and its wavelength (frequency) is modulated at a predetermined second frequency fA2 different from the first frequency so as to be subject to the optical heterodyne interference. After the modulation, a frequency difference ΔfA between the frequency fA1 of the first A surface measuring light and the frequency fA2 of the second A surface measuring light is not particularly limited, but is, for example, about a few dozen kilohertz (kHz) to a few megahertz (MHz) from a viewpoint of the optical heterodyne interference.

Note that in the present exemplary embodiment, the first A surface measuring light and the second A surface measuring light are modulated by the light modulators 214A (214B), 215A (215B), respectively, but since the predetermined frequency difference ΔfA may be provided between the frequency fA1 of the first A surface measuring light and the frequency fA2 of the second A surface measuring light in order to perform the optical heterodyne interference, only one light modulator may be used.

In the present exemplary embodiment, the optical branching device 212A (212B) causes the second A surface measuring light emitted from the optical branching device 212A (212B) to advance in the direction orthogonal to the advancing direction of the first A surface measuring light, but its advancing direction is bent at a right angle by the reflection mirror 213A (213B) so as to be aligned with the advancing direction of the first A surface measuring light. In such a manner, the reflection mirror 213A (213B) is disposed so as to align the advancing direction of the first A surface measuring light) with the advancing direction of the second A surface measuring light emitted from the optical branching device 212A (212B).

The modulated first A surface measuring light (a first A surface modulated measuring light) emitted from the light modulators 214A (214B) enters the optical branching device 216A (216B) so as to be branched by the optical branching device 216A (216B) into a 1-1st A surface modulated measuring light and a 1-2nd A surface modulated measuring light. The 1-1st A surface modulated measuring light advances in a straight direction, whereas the 1-2nd A surface modulated measuring light advances in a direction orthogonal to the advancing direction of the 1-1st A surface modulated measuring light. The modulated second A surface measuring light (a second A surface modulated measuring light) emitted from the light modulator 215A (215B) enters the optical branching device 217A (217B) so as to be branched into a 2-1st A surface modulated measuring light and a 2-2nd A surface modulated measuring light by the optical branching device 217A (217B). The 2-1st A surface modulated measuring light advances in a straight direction, whereas the 2-2nd A surface modulated measuring light advances in a direction orthogonal to the advancing direction of the 2-1st A surface modulated measuring light.

The 1-1st A surface modulated measuring light emitted from the optical branching device 216A (216B) enters the polarization beam splitter 221A (221B), and the 1-2nd A surface modulated measuring light emitted from the optical branching device 216A (216B) enters the optical branching device 232A (232B) as the pre-emission A surface measuring light. The 2-1st A surface modulated measuring light emitted from the optical branching device 217A (217B) enters the optical branching device 224A (224B), and the 2-2nd A surface modulated measuring light emitted from the optical branching device 217A (217B) enters the optical branching device 232A (232B) via the reflection mirror 231A (231B). The reflection mirror 231A (231B) bends the advancing direction of the 2-2nd A surface modulated measuring light at a right angle.

The pre-emission A surface measuring light (the 1-2nd A surface modulated measuring light) and the 2-2nd A surface modulated measuring light that have entered the optical branching device 232A (232B) are coupled by the optical branching device 232A (232B) so as to be subject to the optical heterodyne interference. An obtained beat light signal as the A surface reference interference light enters the output terminal 234A (234B) via the polarizer 233A (233B). Herein, the optical branching device 232A (232B) functions as an optical coupling unit (an interference unit). The polarizer 233A (233B) extracts polarization components of identical directions, and emits an interference light (an A surface reference interference light) between the 1-2nd A surface modulated measuring light and the 2-2nd A surface modulated measuring light. The A surface reference interference light of the beat light signal emitted from the output terminal 234A (234B) enters an A surface phase detector 3Aa. The A surface interference unit 2A (2B) is connected to the A surface phase detector 3Aa (3Ba) by an optical fiber such as a single-mode optical fiber or a multi-mode optical fiber.

On the other hand, the 1-1st A surface modulated measuring light that has entered the polarization beam splitter 221A (221B) enters the ¼ wave plate 222A (222B) so as to be concentrated by the lens 223A (223B) and be emitted to a portion MP of the first measurement position on the A surface of the object to be measured WA. The 1-1st A surface modulated measuring light that has reflected from the portion MP of the first measurement position on the A surface of the object to be measured WA again enters the polarization beam splitter 221A (221B) via the lens 223A (223B) and the ¼ wave plate 222A (222B) as the post-emission A surface measuring light. Existence of the ¼ wave plate 222A (222B) reverses a polarization state (for example, a P-polarized light or an S-polarized light) in the 1-1st A surface modulated measuring light emitted to the A surface of the object to be measured WA from the polarization beam splitter 221A (221B), and a polarization state (for example, an S-polarized light or a P-polarized light) in the post-emission A surface measuring light that is reflected from the A surface of the object to be measured WA and enters the polarization beam splitter 221A (221B) replace. For this reason, the 1-1st A surface modulated measuring light that has entered the polarization beam splitter 221A (221B) passes through the polarization beam splitter 221A (221B) toward the A surface of the object to be measured WA. Whereas, the post-emission A surface measuring light that has entered the polarization beam splitter 221A (221B) from the A surface of the object to be measured WA via the lens 223A (223B) and the ¼ wave plate 222A (222B) is reflected in a predetermined direction, in the present exemplary embodiment, a direction orthogonal to the direction where the post-emission A surface measuring light advances from the A surface of the object to be measured WA toward the polarization beam splitter 221A (221B). The post-emission A surface measuring light emitted from the polarization beam splitter 221A (221B) enters the optical branching device 224A (224B).

The post-emission A surface measuring light and the 2-1st A surface modulated measuring light that have entered the optical branching device 224A (224B) are coupled by the optical branching device 224A (224B) so as to be subject to the optical heterodyne interference. An obtained beat light signal enters the output terminal 226A (226B) as the A surface measuring interference light via the polarizer 225A (225B). Herein, the optical branching device 224A (224B) functions as an optical coupling unit (an interference unit). The polarizer 225A (225B) extracts polarization components of identical directions, and emits the interference light (the A surface measuring interference light) between the post-emission A surface measuring light and the 2-1st A surface modulated measuring light. The A surface measuring interference light of the beat light signal to be emitted from the output terminal 226A (226B) enters the A surface phase detector 3Aa. The A surface interference unit 2A (2B) is connected to the A surface phase detector 3Aa (3Ba) by, for example, an optical fiber such as a single-mode optical fiber.

The A surface interference unit 2A and the B surface interference unit 2B having such a configuration are disposed so that a portion of the first measurement position on the A surface of the object to be measured WA opposes a portion of the second measurement position on the B surface (namely, on identical positions in a front-to-rear relationship). Alternatively, the 1-1st A surface modulated measuring light to be emitted from the A surface interference unit 2A may be guided by a light guiding member such as an optical fiber so as to be emitted to the portion of the first measurement position on the A surface of the object to be measured WA and so that its reflection light (the post-emission A surface measuring light) enters there. A 1-1st B surface modulated measuring light to be emitted from the B surface interference unit 2B may be guided by a light guiding member such as an optical fiber so as to be emitted to a portion of the second measurement position on the B surface of the object to be measured WA, the portion opposing the portion of the first measurement position, and so that its reflection light (the post-emission B surface measuring light) enters there.

In the present exemplary embodiment, in the A surface interference unit 2A and the B surface interference unit 2B, when the optical heterodyne interference is performed, the first A surface measuring light and the second B surface measuring light are made to be equal in frequency, and the first B surface measuring light and the second A surface measuring light are made to be equal in frequency. More specifically, for example, in the A surface interference unit 2A, a first frequency fA1 of the light modulator 214A and a second frequency fB2 of the light modulator 215B in the B surface interference unit 2B are made to be equal in frequency (for example, 81 MHz) (fA1=fB2=f1=81 MHz). The second frequency fA2 of the light modulator 215A in the A surface interference unit 2A and a first frequency fB1 of the light modulator 214B in the B surface interference unit 2B are made to be equal in frequency (for example, 80 MHz) (fA2=fB1=f2=80 MHz).

Figure 4:
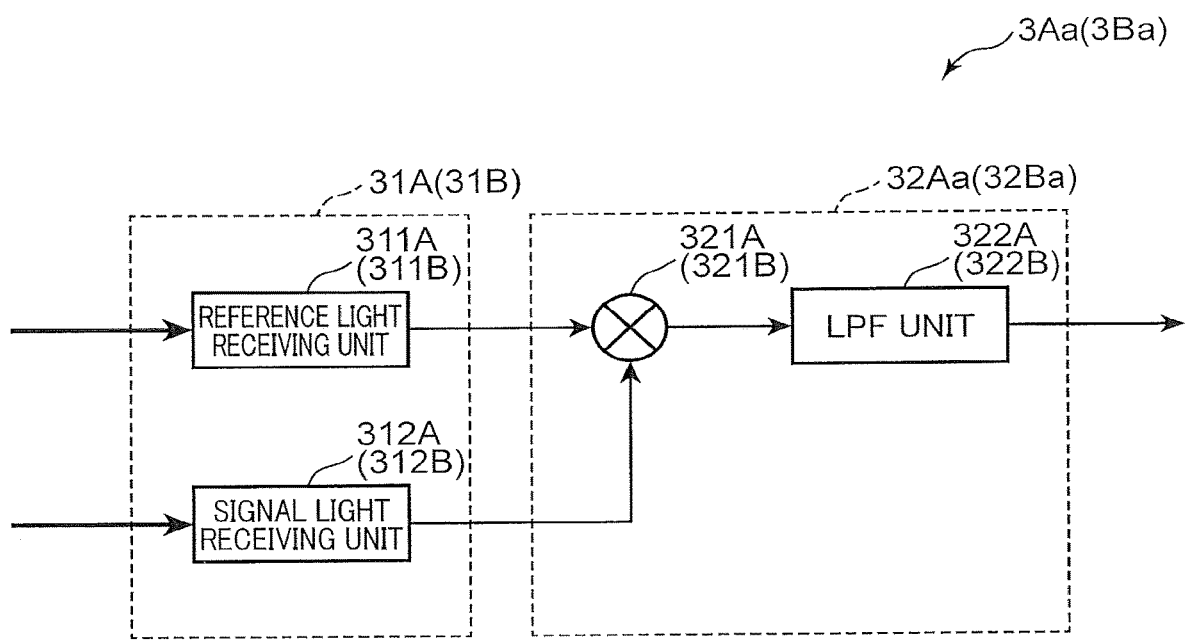
FIG. 4 is a diagram illustrating a configuration of an A surface phase detector (a B surface phase detector) in the shape measuring apparatus.

The A surface phase detector 3A (3Aa and the B surface phase detector 3B (3Ba) will be described below. FIG. 4 is a diagram illustrating a configuration of the A surface phase detector (the B surface phase detector) in the shape measuring apparatus.

The A surface phase detector 3A (3B) is a device that detects phases of the A surface measuring interference light and the A surface reference interference light generated by the A surface interference unit 2A (2B). More specifically, in the present exemplary embodiment, the A surface phase detector 3A (3B) is the A surface phase detector 3Aa (3Ba) that includes, for example as illustrated in FIG. 4, an A surface detector 31A (31B) and an A surface detector 32Aa (32Ba). Note that since the A surface phase detector 3Aa and the B surface phase detector 3Ba have identical configurations, the A surface phase detector 3Aa will be mainly described below. The reference symbols given to the components of the B surface phase detector 3Ba corresponding to the components of the A surface phase detector 3Aa are given into parenthesis after the reference symbols given to the components of the A surface phase detector 3Aa. When the components of the B surface phase detector 3Ba are described, the "A surface" is changed into the "B surface". For this reason, FIG. 4 illustrates mainly the configuration of the A surface phase detector 3Aa, and the configuration of the B surface phase detector 3Ba is illustrated in FIG. 4 by indicating the reference symbols in parentheses given to the components of the B surface phase detector 3Ba.

The A surface detector 31A (31B) is a device that detects light intensity signals of the A surface measuring interference light and the A surface reference interference light in the A surface interference unit 2A (2B). The A surface detector 31A (31B) outputs the light intensity signals to the A surface detector 32Aa (32Ba). More specifically, the A surface detector 31A (31B) includes a reference light receiving unit 311A (311B) that receives the A surface reference interference light that has entered from the A surface interference unit 2A (2B), and photoelectrically converts the received A surface reference interference light to output its light intensity signal, and a measuring light receiving unit 312A (312B) that receives the A surface measuring interference light that has entered from the A surface interference unit 2A (2B) and photoelectrically converts the received A surface measuring interference light to output its light intensity signal. The reference light receiving unit 311A (311B) and the measuring light receiving unit 312A (312B) are configured by photoelectric conversion elements such as photodiodes that converts the incident light into an electric signal of a signal level based on a light amount so as to output the electric signal.

The A surface detector 32Aa (32Ba) is a device that detects a phase difference between the A surface reference interference light and the A surface measuring interference light (phase detection). An example of the detector is a single-phase lock-in amplifier 32Aa (32Ba). The single-phase lock-in amplifier 32Aa (32Ba) that is one example of the A surface detector 32Aa (32Ba) includes a multiplier 321A (321B) and a low-pass filter unit (an LPF unit) 322A (322B). The multiplier 321A (321B) is a device that multiplies inputs. In the present exemplary embodiment, the multiplier 321A (321B) receives a light intensity signal of the A surface reference interference light detected by the reference light receiving unit 311A (311B) and a light intensity signal of the A surface measuring interference light detected by the measuring light receiving unit 312A (312B). The multiplier 321A (321B) multiplies the light intensity signal of the A surface reference interference light and the light intensity signal of the A surface measuring interference light to output a multiplied result to the LPF unit 322A (322B). The LPF unit 322A (322B) is a device that cuts an alternating-current component included in the multiplied result calculated by the multiplier 321A (321B), and outputs a direct-current component of the multiplied result as an output signal to the arithmetic controller 4. The single-phase lock-in amplifier 32Aa (32Ba) detects the phase difference between the A surface reference interference light and the A surface measuring interference light (phase detection) based on the A surface reference interference light to output the detected phase difference.

The A surface phase detector 3Aa then outputs a phase obtained by this phase detection (the direct-current component of the multiplied result: a first phase) to the arithmetic controller 4. The B surface phase detector 3Ba outputs a phase obtained by the phase detection (the direct-current component of the multiplied result; a second phase) to the arithmetic controller 4.

Figure 5:
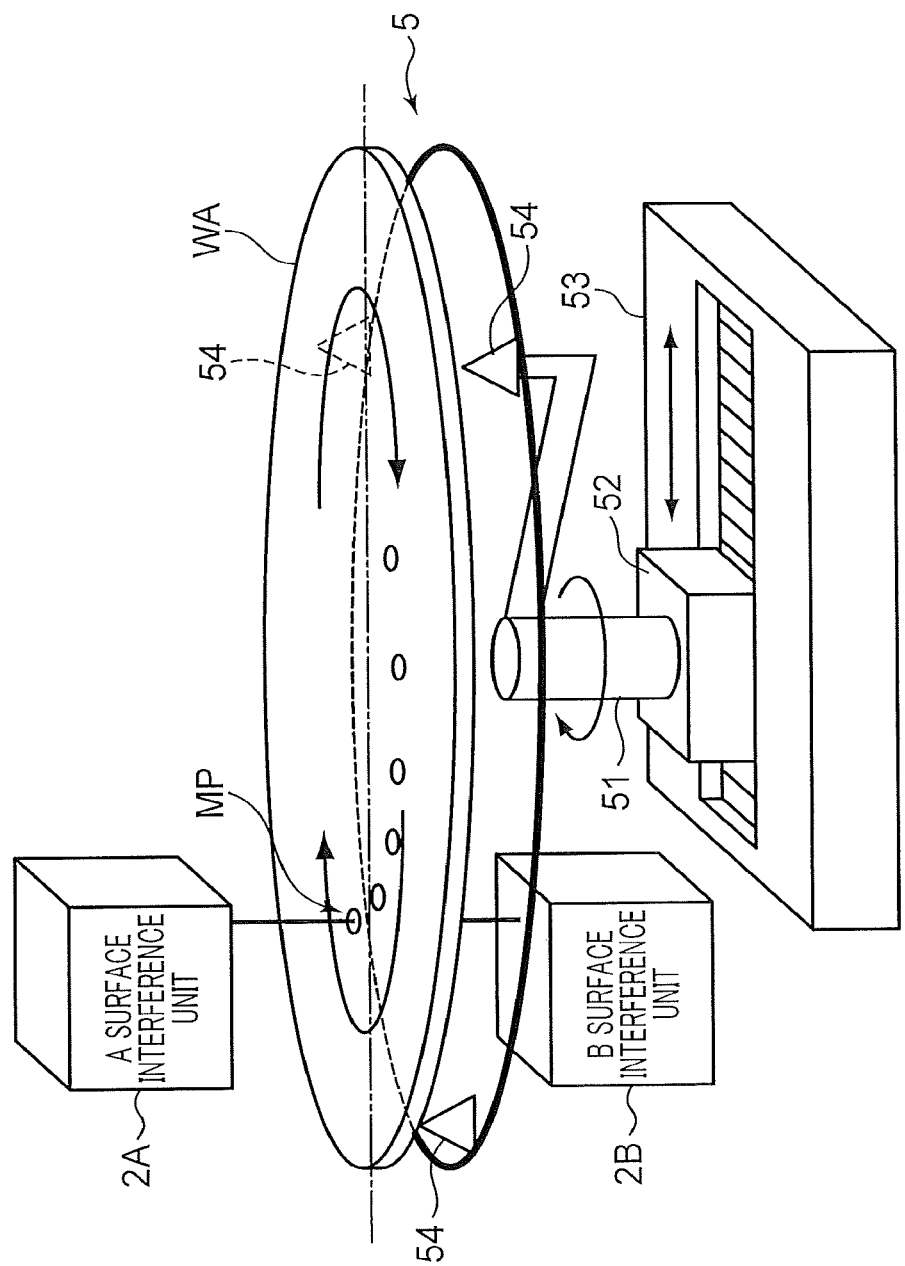
FIG. 5 is a diagram illustrating a configuration of a stage in the shape measuring apparatus.

The stage 5 will be described below. FIG. 5 is a diagram illustrating a configuration of the stage in the shape measuring apparatus. The stage 5 is a device that moves the object to be measured WA in a horizontal direction orthogonal to a thickness direction of the object to be measured WA, based on control by the arithmetic controller 4. When an orthogonal XYZ coordinate system is set so that the thickness direction of the object to be measured WA is defined as a Z axis and two directions orthogonal to each other in a horizontal plane orthogonal to the thickness direction are defined as an X axis and a Y axis, respectively, the stage 5 may be an XY stage that can move the object to be measured WA in an X axial direction and a Y axial direction. However, in the present exemplary embodiment, when the object to be measured WA is a semiconductor wafer, the stage 5 rotationally moves the object to be measured WA, and moves it also in a radial direction of the rotation because the semiconductor wafer has generally a disc shape. For this reason, measurement values on the portions MP of the first and second measurement positions are preferably expressed by a cylindrical coordinate system RθZ.

The stage 5 includes, more specifically, for example as illustrated in FIG. 5, a supporting section 54, a rotation shaft 51, a rotation driver 52, and a linear driver 53. The supporting section 54 has three arm members that extend in the radial direction from a center member. The supporting section 54 supports the object to be measured WA such as a semiconductor wafer having a disc shape at three portions on a circumference at edge portions (edge areas) of forward ends of the arm members. The rotation shaft 51 is connected to the center member of the supporting section 54. The rotation driver 52 drives to rotate the rotation shaft 51. The linear driver 53 linearly moves the rotation driver 52 within a predetermined moving range. The rotation driver 52 and the linear driver 53 include, for example, an actuator, such as a servo motor, and a drive mechanism such as a reduction gear. The stage 5 having this configuration can measure variations in the thickness on the portions MP of the first and second measurement positions of the object to be measured WA accurately at a high speed without influencing a vibration of the object to be measured WA.

In the stage 5 having such a configuration, the object to be measured WA is placed on the forward ends of the three arm members in the supporting section 54 and is supported at three points by the supporting section 54. The stage 5 is disposed with respect to the disposing positions of the A surface interference unit 2A and the B surface interference unit 2B so that when the object to be measured WA is placed on the stage 5 in the above manner, the A surface and the B surface of the object to be measured WA can be measured by the A surface interference unit 2A and the B surface interference unit 2B.

In the stage 5 having such a configuration, the rotation driver 52 rotates based on the control by the arithmetic controller 4, the supporting section 54 rotates via the rotation shaft 51, and the object to be measured WA rotates about the rotation shaft 51 (the center member of the supporting section 54). The linear driver 53 linearly moves the rotation driver 52 based on the control by the arithmetic controller 4 so that the object to be measured WA moves along the radial direction. In combination of the rotational movement of the object to be measured WA by the rotation driver 52 and the movement of the object to be measured WA in the linear direction by the linear driver 53, desired portions MP of the object to be measured WA can be measured within the moving range of the stage 5.

With return to FIG. 1, the input unit 6 is a device that inputs commands for instructing start of measurement and data such as attribute information about the object to be measured WA.

Examples of the input unit 6 are an operation panel having a plurality of input switches and a keyboard. The output unit 7 is a device that outputs commands and data received by the input unit 6, and measurement results. Examples of the output unit 7 are display devices such as a cathode ray tube (CRT) display, a liquid crystal display (an LCD), and an organic electroluminescent (EL) display, and a printing device such as a printer. The input unit 6 and the output unit 7 are connected to the arithmetic controller 4.

The arithmetic controller 4 is a circuit that controls respective sections of the shape measuring apparatus S based on the functions, and obtains a variation in the thickness of the object to be measured WA. More specifically, in the present exemplary embodiment, the arithmetic controller 4 is the arithmetic controller 4a that functionally includes a thickness arithmetic unit 41 (41a) and a controller 42. The controller 42 functionally includes a stage controller 421 and a light source controller 422. The arithmetic controller 4a includes, for example, a read only memory (ROM) that is a nonvolatile storage element, an electrically erasable programmable read only memory (EEPROM), a central processing unit (CPU), a random access memory (RAM) to be a so-called working memory of the CPU, and a microcomputer having peripheral circuit of these memories and unit. The ROM stores various predetermined programs such as a control program for controlling the respective sections of the shape measuring apparatus S based on the functions, and an arithmetic program for obtaining a variation in the thickness of the object to be measured WA based on the first phase obtained by the A surface phase detector 3Aa detecting phases of the A surface measuring interference light and the A surface reference interference light generated by the A surface interference unit 2A and the second phase obtained by the B surface phase detector 3Ba detecting the phases of the B surface measurement interference light and the B surface reference interference light generated by the B surface interference unit 2B; and various predetermined data such as data necessary for executing the predetermined programs. The EEPROM is a rewritable nonvolatile storage element. The CPU reads the predetermined programs and executes the programs to execute predetermined control process or arithmetic process. The RAM stores data or the like to be generated during the execution of the predetermined programs. Note that the arithmetic controller 4 may have a hard disc device that stores comparatively large volume data as necessary.

The thickness arithmetic unit 41 obtains a variation in the thickness of the object to be measured WA based on the first phase obtained by the A surface phase detector 3Aa detecting the phases of the A surface measuring interference light and the A surface reference interference light generated by the A surface interference unit 2A and the second phase obtained by the B surface phase detector 3Ba detecting the phases of the B surface measuring interference light and the B surface reference interference light generated by the B surface interference unit 2B. More specifically, in the present exemplary embodiment, the thickness arithmetic unit 41 is the thickness arithmetic unit 41a that obtains a distance variation between the A surface and the B surface of the object to be measured WA based on a difference ($\Delta\Phi A - \Delta\Phi B$) between a first phase $\Delta\Phi A$ obtained by the A surface phase detector 3Aa detecting the phases of the A surface measuring interference light and the A surface reference interference light generated by the A surface interference unit 2A and a second phase $\Delta\Phi B$ obtained by the B surface phase detector 3Ba detecting the phases of the B surface measuring interference light and the B surface reference interference light generated by the B surface interference unit 2B, as the variation in the thickness of the object to be measured WA. The difference ($\Delta\Phi A - \Delta\Phi B$) is a value relating to the thickness of the object to be measured WA. Under approximation such that a wavelength of the A surface measuring light is equal to the wavelength of the B surface measuring light, when the wavelength of the A surface measuring light is represented by $\lambda$, a variation $\Delta D$ in the thickness of the object to be measured WA is obtained based on, for example, an equation such that $\Delta D = (\Delta\Phi A - \Delta\Phi B) \times (\lambda/2)/(2\pi)$. Note that, in the present exemplary embodiment, the A surface measuring light and the B surface measuring light are branched from the light from the identical light source, and the wavelength of the A surface measuring light matches with the wavelength of the B surface measuring light.

The controller 42 controls the respective units of the shape measuring apparatus S based on the functions, and makes the entire control of the shape measuring apparatus S. The stage controller 421 controls the respective operations of the rotation driver 52 and the linear driver 53 in the stage 5 so that the object to be measured WA moves in the horizontal direction orthogonal to the thickness direction in order to measure the plurality of portions MP in the object to be measured WA. The light source controller 422 controls an operation of the light source unit 1.

Figure 6:
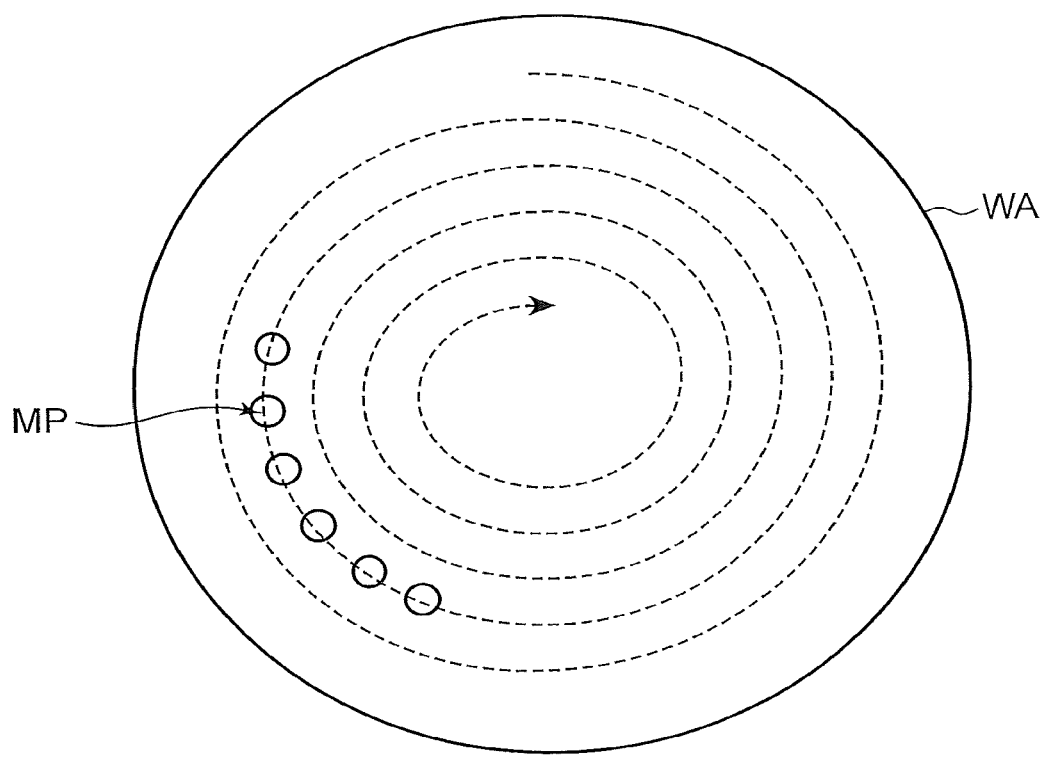
FIG. 6 is a diagram for describing a portion to be measured in a case where a variation in a thickness of an object to be measured is measured by using the shape measuring apparatus.
Figure 7:
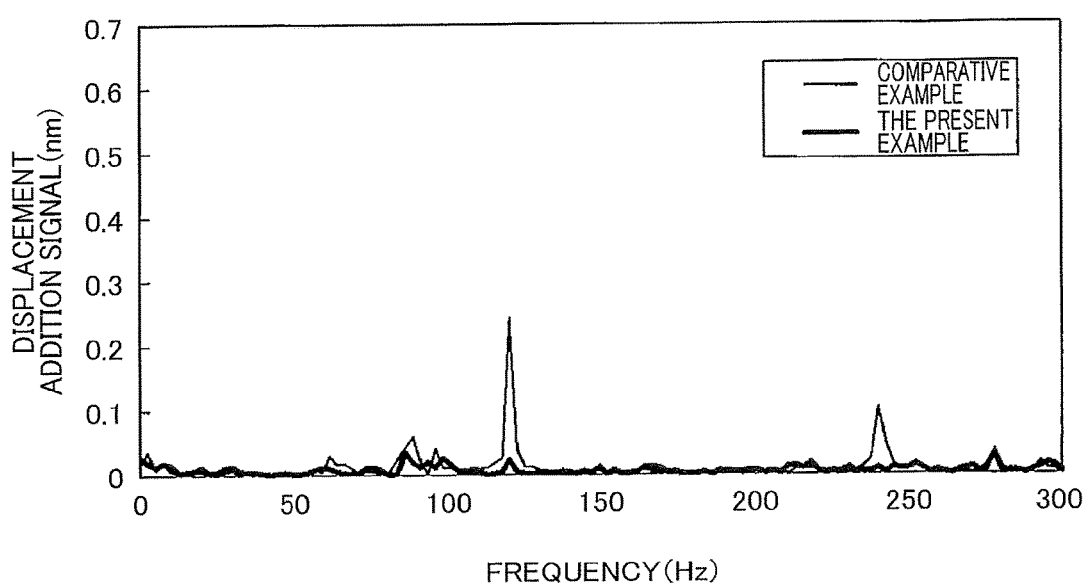
FIG. 7 is a diagram illustrating one example of a measured result.

The operation of the shape measuring apparatus S according to the present exemplary embodiment will be described below. FIG. 6 is a diagram for describing a portion to be measured in a case where a variation in the thickness of the object to be measured is measured by using the shape measuring apparatus. FIG. 7 is a diagram illustrating one example of a measured result.

When power, not illustrated, is turned on, the shape measuring apparatus S is activated, and the arithmetic controller 4a initializes the respective units as necessary. Execution of the predetermined programs makes the thickness arithmetic unit 41a and the controller 42 functionally configure the arithmetic controller 4a, and makes the stage controller 421 and the light source controller 422 functionally configure the controller 42. When the object to be measured WA such as a plate-shaped semiconductor wafer is placed on the stage 5 and the arithmetic controller 4a receives a command for commanding the measurement start from the input unit 6, the arithmetic controller 4a starts to measure the thickness of the object to be measured WA.

First, the light source controller 422 of the arithmetic controller 4a drives the light source unit 1, and causes the single wavelength laser beam source 11 to emit a predetermined laser beam. Due to the emission of the predetermined laser beam from the single wavelength laser beam source 11, a function of the above-described optical system causes the A surface measuring light and the B surface measuring light to be emitted from the output terminal 15 and the output terminal 17 of the light source unit 1, respectively.

The A surface measuring light emitted from the output terminal 15 of the light source unit 1 propagates through the polarization maintaining optical fiber, and enters the A surface interference unit 2A. The A surface interference unit 2A generates the A surface reference interference light and the A surface measuring interference light on the portions MP of the first measurement position from the A surface measuring light that has entered due to the function of the optical system so as to emit them from the output terminal 234A and the output terminal 226A, respectively. The A surface reference interference light and the A surface measuring interference light emitted from the output terminal 234A and the output terminal 226A of the A surface interference unit 2A, respectively, propagate through the optical fibers, respectively, and enter the A surface phase detector 3Aa. The A surface phase detector 3Aa detects the phase difference between the A surface reference interference light and the A surface measuring interference light as the first phase ΔΦA through the phase detection of the A surface reference interference light and the A surface measuring interference light based on the A surface reference interference light, and outputs the first phase ΔΦA from the A surface phase detector 3Aa to the arithmetic controller 4.

On the other hand, similarly, the B surface measuring light emitted from the output terminal 17 of the light source unit 1 propagates through the polarization maintaining optical fiber, and enters the B surface interference unit 2B. The B surface interference unit 2B generates the B surface reference interference light and the B surface measuring interference light on the portions MP of the second measurement position due to the effect of the optical system from the B surface measuring light that has entered, and emits the generated lights from the output terminal 234B and the output terminal 226B, respectively. The B surface reference interference light and the B surface measuring interference light emitted from the output terminal 234B and the output terminal 226B of the B surface interference unit 2B, respectively, propagate through the optical fibers, and enter the B surface phase detector 3Ba. The B surface phase detector 3Ba detects the phase difference between the B surface reference interference light and the B surface measuring interference light as the second phase ΔΦB based on the B surface reference interference light through the phase detection of the B surface reference interference light and the B surface measuring interference light, and outputs the second phase ΔΦB from the B surface phase detector 3Ba to the arithmetic controller 4.

When the light source unit 1, the A surface interference unit 2A, the A surface phase detector 3Aa, the B surface interference unit 2B, and the B surface phase detector 3Ba perform such operations, the stage controller 421 of the arithmetic controller 4a controls the stage 5 to move the object to be measured WA in the horizontal direction orthogonal to the thickness direction. More specifically, for example, in the present exemplary embodiment, the stage controller 421 controls the rotation driver 52 of the stage 5 to rotate the object to be measured WA, and also controls the linear driver 53 of the stage 5 to move the object to be measured WA in the linear direction. While the stage controller 421 is controlling the stage 5 in such a manner, the arithmetic controller 4a obtains data of the first and second phases ΔΦA, ΔΦB from the A surface phase detector 3Aa and the B surface phase detector 3Ba every time when the portions MP of the first and second measurement positions become predetermined positions preset. With such an operation, as illustrated in FIG. 6, while the first and second measurement positions on the object to be measured WA are sequentially changed so that loci of a plurality of the first and second measurement positions trace spirals, the data of the first and second phases ΔΦA, ΔΦB in the portions MP of the object to be measured WA are obtained.

When the data of the first and second phases ΔΦA, ΔΦB are obtained, the thickness arithmetic unit 41a of the arithmetic controller 4a obtains variations ΔD in the thickness of the object to be measured WA in the portions MP of the first and second measurement positions are obtained based on the above-described arithmetic equation, and outputs the variations ΔD to the output unit 7. The output unit 7 displays the variations ΔD in the thickness of the object to be measured WA on the portions MP of the first and second measurement positions as a surface shape of the object to be measured WA.

With such an operation, in the shape measuring apparatus S and the shape measuring method provided to the apparatus according to the present exemplary embodiment, when the optical heterodyne interference is performed, the first A surface measuring light and the second B surface measuring light are made to be equal in frequency, and the first B surface measuring light and the second A measuring light are made to be equal in frequency. For this reason, when the variations ΔD in thickness of the object to be measured WA are obtained based on the first phase ΔΦA and the second phase ΔΦB, noise components included in the first and second phases ΔΦA, ΔΦB can be canceled each other. As a result, noises can be reduced by the shape measuring apparatus S and the shape measuring method.

The working effect of the shape measuring apparatus S and the shape measuring method will be described in more detail below.

First, when an amplitude and an angular frequency of an ideal signal (a signal from which a noise is removed) are represented by S and Δω, respectively, an amplitude and an angular frequency of the noise component are represented by N and ωn, respectively, a phase desired to be obtained is represented by φ, and a time is represented by t, a light intensity signal Is of a measuring interference light and a light intensity signal Ir of a reference interference light can be expressed by the following Equations 1 and 2.

$$Is = S \cdot \sin(\Delta\omega \cdot t + \phi) + N \cdot \sin(\omega n \cdot t) \quad \text{Equation 1;}$$

$$Ir = S \cdot \sin(\Delta\omega \cdot t) + N \cdot \sin(\omega n \cdot t) \quad \text{Equation 2;}$$

Therefore, when the single-phase lock-in amplifier detects a phase, a direct-current component DC that remains after the low-pass filter is expressed by the following Equation 3.

$$DC = S^2/2 \cos \phi - N^2/2 \cos(2\omega n \cdot t) \quad \text{Equation 3;}$$

In a case of the ideal signal that does not include a noise component, since a first term of Equation 3 corresponds one-to-one with the phase φ, the phase φ can be accurately detected. However, as shown in Equation 3, a noise component that cannot be removed by the low-pass filter is erroneously detected in a second term, the phase φ cannot be accurately detected.

Therefore, in the present exemplary embodiment, as described above, when the optical heterodyne interference is performed, the A surface interference unit 2A and the B surface interference unit 2B make the first A surface measuring light and the second B surface measuring light equal in frequency, and make the first B surface measuring light and the second A measuring light equal in frequency, respectively. That is, the first frequency fA1 of the light modulator 214A in the A surface interference unit 2A and the second frequency fB2 of the light modulator 215B in the B surface interference unit 2B are made to be equal in frequency f1 (fA1=fB2=f1). The second frequency fA2 of the light modulator 215A in the A surface interference unit 2A and the first frequency fB1 of the light modulator 214B in the B surface interference unit 2B are made to be equal in frequency f2 (fA2=fB1=f2).

In this case, a light intensity signal IsA of the A surface measuring interference light, a light intensity signal IrA of the A surface reference interference light, a light intensity signal IsB of the B surface measuring interference light, and a light intensity signal IrB of the B surface reference interference light are expressed by the following Expressions 4, 5, 6, and 7. These light intensity signals are detected depending on a variation in the thickness.

$$IsA \propto S \cdot \sin(2\pi \cdot (f1-f2) \cdot t + \phi A) \quad \text{Expression 4};$$

$$IrA \propto S \cdot \sin(2\pi \cdot (f1-f2) \cdot t) \quad \text{Expression 5};$$

$$IsB \propto S \cdot \sin(2\pi \cdot (f1-f2) \cdot t - \phi B) \quad \text{Expression 6};$$

$$IrB \propto S \cdot \sin(2\pi \cdot (f1-f2) \cdot t) \quad \text{Expression 7};$$

Herein, the signal ∝ represents that a right side and a left side bear a proportional relationship to each other. The symbol φA represents a phase obtained by the A surface interference unit 2A based on a variation in the thickness, the symbol φB represents a phase obtained by the B surface interference unit 2B based on a variation in the thickness.

As expressed by Expressions 4 through 7, a varying direction of the phase φB is opposite to a varying direction of the phase φA. Therefore, when a phase of a noise component is denoted by φn, the phases that include the noise components and are detected by the single-phase lock-in amplifiers 32Aa, 32Ba are expressed as ΔΦA=φA+φn in the A surface phase detector 3Aa and as ΔΦB=−φB+φn in the B surface phase detector 3Ba. The phases φA, φB are phase components that increase or decrease depending on a variation in the thickness, and the noise components expressed by Equations 1 and 2 are irrelevant to the frequencies f1, f2 of the light modulators 214A, 215A; 214B, 215B in the interference lights. For this reason, the symbol φn is not reversed.

Therefore, as described above, when the variation ΔD in the thickness of the object to be measured WA is obtained from a difference between the first phase ΔΦA and the second phase ΔΦB, the phase φn of the noise component is cancelled in a manner that φA+φn−(−φB+φn)=φA+φB, and the noise can be removed.

FIG. 7 illustrates one example of a measured result of measuring a variation in the thickness of the object to be measured WA by the shape measuring apparatus S according to the present exemplary embodiment and a shape measuring apparatus Sr according to a comparative example. The shape measuring apparatus Sr (not illustrated) according to the comparative example is similar to the shape measuring apparatus S according to the present exemplary embodiment except that when the optical heterodyne interference is performed, the shape measuring apparatus Sr makes the first A surface measuring light and the first B surface measuring light equal in frequency, and the second A surface measuring light and the second B measuring light equal in frequency (fA1=fB1, fA2=fB2). In the example illustrated in FIG. 7, since the measurement portions of the object to be measured WA are fixed, a variation in the thickness obtained by adding amounts of displacement of the A surface interference unit 2A and the B surface interference unit 2B that form a pair becomes equal to 0. For this reason, the variations to be detected by the shape measuring apparatuses S, Sr are noises. FIG. 7 illustrates a graph of a spectrum obtained by performing Fourier transform on the variation in the thickness. An axis of abscissa in FIG. 7 represents a frequency, and an axis of ordinate represents the variation in the thickness obtained by adding the amounts of displacement. As is clear from FIG. 7, in the shape measuring apparatus Sr according to the comparative example, a peak appears in about 120 Hz and about 240 Hz and a noise is included. However, in the shape measuring apparatus S according to the present exemplary embodiment, such peaks are reduced or do not appear and thus a noise is removed.

Since a noise component can be removed in such a manner, the shape measuring apparatus S and the shape measuring method according to the present exemplary embodiment can further reduce a noise. For example, the shape measuring apparatus S and the shape measuring method according to the present exemplary embodiment enable fine measurement at a nanometer level or a sub-nanometer level. The shape measuring apparatus S and the shape measuring method can be preferably used for applications such as product inspection during or after manufacturing in factories where semiconductor wafers are manufactured.

In the above manner, the thickness arithmetic unit 41 obtains the variation ΔD in the thickness of the object to be measured WA through subtraction, but may obtain the variation ΔD in the thickness of the object to be measured WA through addition. In this case, the shape measuring apparatus S includes an A surface phase detector 3Ab, a B surface phase detector 3Bb, and an arithmetic controller 4b instead of the A surface phase detector 3Aa, the B surface phase detector 3Ba, and the arithmetic controller 4a. The arithmetic controller 4b includes a thickness arithmetic unit 41b instead of the thickness arithmetic unit 41a.

Figure 8:
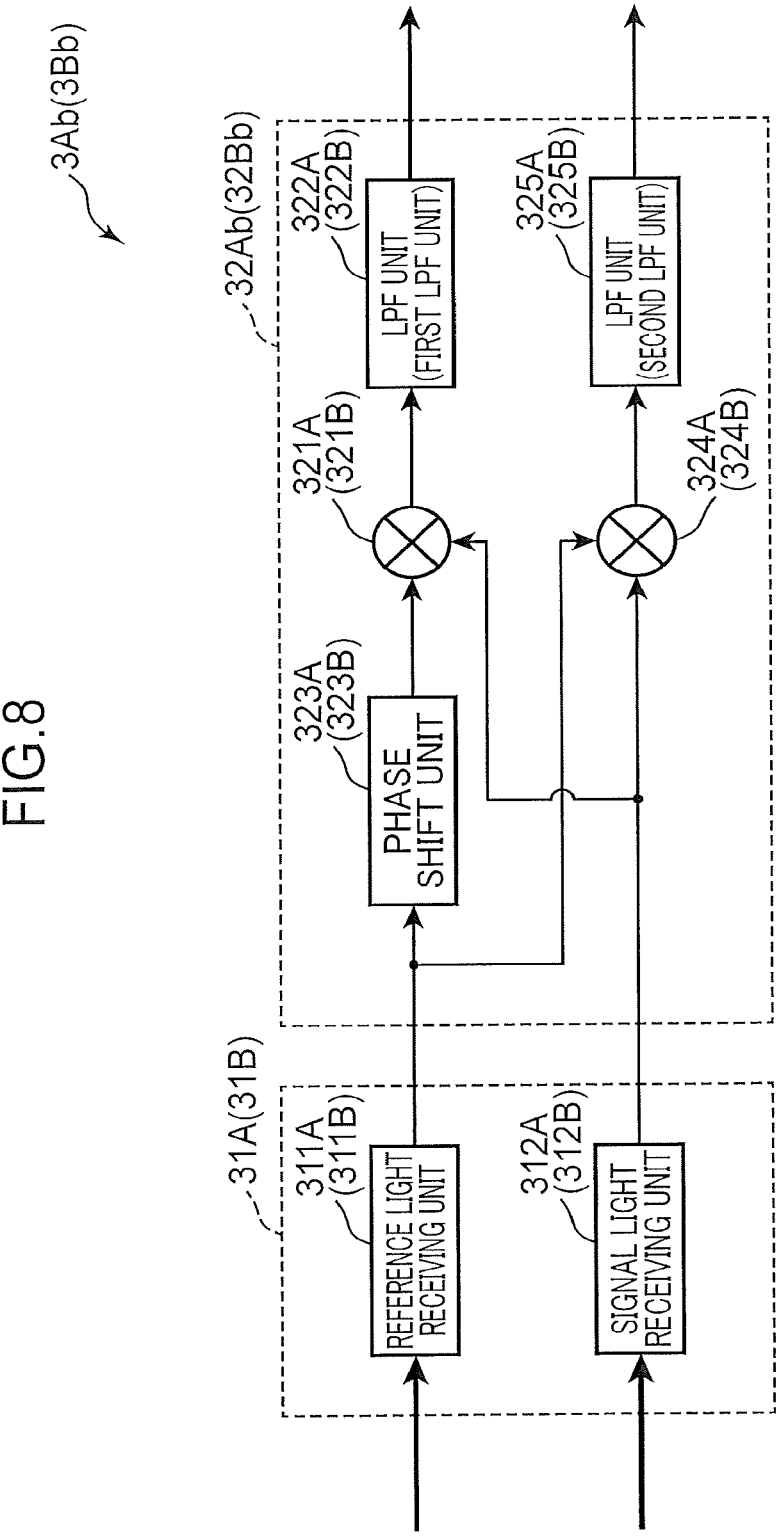
FIG. 8 is a diagram illustrating a configuration of the A surface phase detector (the B surface phase detector) according to a modification.

FIG. 8 is a diagram illustrating a configuration of the A surface phase detector (the B surface phase detector) according to a modified form. Note that since the A surface phase detector 3Ab and the B surface phase detector 3Bb have identical configurations, the A surface phase detector 3Ab will be mainly described below. The reference symbols given to the components of the B surface phase detector 3Bb corresponding to the components of the A surface phase detector 3Ab are given into parenthesis after the reference symbols given to the components of the A surface phase detector 3Ab. When the components of the B surface phase detector 3Bb are described, the "A surface" is changed into the "B surface". For this reason, FIG. 8 illustrates mainly the components of the A surface phase detector 3Ab, and the components of the B surface phase detector 3Bb is illustrated in FIG. 8 by indicating the reference symbols in parentheses given to the components of the B surface phase detector 3Bb.

The A surface phase detector 3Ab (3Bb) includes, as illustrated in FIG. 8, the A surface detector 31A (31B) and an A surface detector 32Ab (32Bb). Since the A surface detector 31A (31B) in the A surface phase detector 3Ab (3Bb) according to the modified form is similar to the A surface detector 31A (31B) in the above-described A surface phase detector 3Aa (3Ba), description thereof is omitted.

The A surface detector 32Ab (32Bb) is a device that detects a phase difference between the A surface reference interference light and the A surface measuring interference light (phase detection). In this modified form, the A surface detector 32Ab (32Bb) is a two-phase lock-in amplifier 32Ab (32Bb) that when a phase difference between a measurement signal and a reference signal is represented by $\theta$, detects phases of the measurement signal and the reference signal so as to output two output signals $\cos\theta$ and $\sin\theta$. The two-phase lock-in amplifier 32Ab (32Bb) as one example of the A surface detector 32Ab (32Bb) includes the multipliers 321A (321B), 324A (324B), low-pass filters (LPFs) sections 322A (322B), 325A (325B), and a phase shift unit 323A (323B). The multiplier 324A (324B) is a device that multiplies inputs similarly to the multiplier 321A (321B). In the present modified mode, the multiplier 321A (321B) receives a light intensity signal of the A surface reference interference light detected by the reference light receiving unit 311A (311B) and a light intensity signal of the A surface measuring interference light detected by the measuring light receiving unit 312A (312B), via the phase shift unit 323A (323B). The multiplier 321A (321B) multiplies the light intensity signal of the A surface reference interference light and the light intensity signal of the A surface measuring interference light via the phase shift unit 323A (323B), and outputs a multiplied result to the LPF unit 322A (322B). The multiplier 324A (324B) receives a light intensity signal of the A surface reference interference light detected by the reference light receiving unit 311A (311B) and a light intensity signal of the A surface measuring interference light detected by the measuring light receiving unit 312A (312B). The multiplier 321A (321B) multiplies the light light intensity signal of the A surface reference interference light and the light intensity signal of the A surface measuring interference light, and outputs a multiplied result to the LPF unit 325A (325B). The LPF unit 322A (322B) is a device that cuts an alternating-current component included in the multiplied result calculated by the multiplier 321A (321B), and outputs a direct-current component of the multiplied result as an output signal to the arithmetic controller 4. The LPF unit 325A (325B) is a device that cuts an alternating-current component included in the multiplied result computed by the multiplier 324A (324B), and outputs a direct-current component of the multiplied result as an output signal to the arithmetic controller 4. The phase shift unit 323A (323B) is a device that shifts a phase of an input signal by 90°. For this reason, the LPF unit 325A (325B) outputs an output signal of $\sin\theta$, and the LPF unit 322A (322B) outputs an output signal of $\cos\theta$.

The thickness arithmetic unit 41b obtains the variation $\Delta D$ in the thickness of the object to be measured WA based on the output signals from the two-phase lock-in amplifier 32Ab in the A surface phase detector 3Ab and the two-phase lock-in amplifier 32Bb in a B surface phase detector 3Bb. More specifically, the thickness arithmetic unit 41b obtains the variation $\Delta D$ in the thickness of the object to be measured WA based on addition of a phase obtained as the first phase based on the result of dividing the output signal of $\sin\theta$ output from the two-phase lock-in amplifier 32Ab in the A surface phase detector 3Ab by the output signal of $\cos\theta$ and a phase obtained as the second phase based on the result of dividing the output signal of $\cos\theta$ output from the two-phase lock-in amplifier 32Bb in the B surface phase detector 3Bb by the output signal of $\sin\theta$. Alternatively, the thickness arithmetic unit 41b obtains the variation $\Delta D$ in the thickness based on addition of a phase obtained as the first phase based on a result of dividing the output signal of $\cos\theta$ output from the two-phase lock-in amplifier 32Ab in the A surface phase detector 3Ab by the output signal of $\sin\theta$ and a phase obtained as the second phase based on a result of dividing the output signal of $\sin\theta$ output from the two-phase lock-in amplifier 32Bb in the B surface phase detector 3Bb by the output signal of $\cos\theta$.

In this modified form, since the thickness arithmetic unit 41b uses the phase obtained as the first phase based on the result of dividing the output signal of $\sin\theta$ by the output signal of $\cos\theta$ and the phase obtained as the second phase based on the result of dividing the output signal of $\cos\theta$ by the output signal of $\sin\theta$, the thickness arithmetic unit 41b can obtain the variation $\Delta D$ in the thickness of the object to be measured WA based on the addition of these phases. Alternatively, since the thickness arithmetic unit 41b uses the phase obtained as the first phase based on the result of dividing the output signal of $\cos\theta$ by the output signal of $\sin\theta$ and the phase obtained as the second phase based on the result of dividing the output signal of $\sin\theta$ by the output signal of $\cos\theta$, the thickness arithmetic unit 41b can obtain the variation $\Delta D$ in the thickness of the object to be measured WA based on the addition of these phases.

That is, normally, the phase $\theta$ is obtained from the output signal of $\sin\theta$ and the output signal of $\cos\theta$ output from the two-phase lock-in amplifier based on an equation that $\theta=\tan^{-1} 2 (\sin\theta/\cos\theta)$. For this reason, when the output signal of $\sin\theta$ and the output signal of $\cos\theta$ are interchanged so that $\theta=-\theta'$, the following Equation 8 holds.

$$(\cos\theta'/\sin\theta')=(\sin(\theta'-90)/\cos(\theta'-90))=\tan(\theta'-90)=-\tan\theta'=\tan(-\theta')=\tan\theta \quad \text{Equation 8;}$$

In such a manner, a reversed phase $\theta$ is obtained, and thus, as described above, the variation $\Delta D$ in the thickness of the object to be measured WA is obtained by addition.

The A surface phase detector 3Ab includes first A and second A output terminals that output the output signal of $\sin\theta$ and the output signal of $\cos\theta$, respectively. The B surface phase detector 3Bb includes first B and second B output terminals that output the output signal of $\sin\theta$ and the output signal of $\cos\theta$, respectively. The arithmetic controller 4 includes first A and second A input terminals that input the output signal of $\sin\theta$ and the output signal of $\cos\theta$ in the A surface phase detector 3Ab, and first B and second B input terminals that input the output signal of $\sin\theta$ and the output signal of $\cos\theta$ in the B surface phase detector 3Bb. When the thickness arithmetic unit 41b obtains the variation $\Delta D$ in the thickness of the object to be measured WA based on addition of a phase obtained based on a result of dividing the signal input from the second A input terminal by the signal input from the first A input terminal and a phase obtained based on a result of dividing the signal input from the second B input terminal by the signal input from the first B input terminal, the second A and first A output terminals may be connected to the first A and second A input terminals, respectively, and the first B and second B output terminals may be connected to the first B and second B input terminals, respectively. Alternatively, the first A and second A output terminals may be connected to the first A and second A input terminals, respectively, and the second B and first B output terminals may be connected to the first B and second B input terminals, respectively. Normally, when the output terminals and the input terminals are connected to each other, respectively, so that $\tan\theta$ is obtained by dividing the output signal of $\cos\theta$ by the output signal of $\sin\theta$ and thus the phase θ is obtained, and one set of the connecting modes is interchanged, the thickness arithmetic unit 41b can obtain the variation ΔD in the thickness of the object to be measured WA based on addition of a phase obtained as the first phase based on the result of dividing the output signal of sin θ by the output signal of cos θ, the output signals of sin θ and cos θ being output from the two-phase lock-in amplifier 32Ab in the A surface phase detector 3Ab, and a phase obtained as the second phase based on the result of dividing the output signal of cos θ by the output signal of sin θ, the output signals of cos θ and sin θ being output from the two-phase lock-in amplifier 32Bb in the B surface phase detector 3Bb. Alternatively, the thickness arithmetic unit 41b obtains the variation ΔD in the thickness based on addition of a phase obtained as the first phase based on a result of dividing the output signal of cos θ by the output signal of sin θ, the output signals of cos θ and sin θ being output from the two-phase lock-in amplifier 32Ab in the A surface phase detector 3Ab, and a phase obtained as the second phase based on based on a result of dividing the output signal of sin θ by the output signal of cos θ, the output signal of sin θ and cos θ being output from the two-phase lock-in amplifier 32Bb in the B surface phase detector 3Bb.

The specification discloses the aforementioned arrangements. The following is a summary of the primary arrangements of the embodiments.

A shape measuring apparatus from one aspect includes a light source unit that generates a measuring light, an optical branching device that branches the measuring light generated by the light source unit into an A surface measuring light and a B surface measuring light, an A surface interference unit that generates an A surface measuring interference light and an A surface reference interference light, the A surface measuring interference light being generated by further branching the A surface measuring light branched by the optical branching device into a first A surface measuring light and a second A surface measuring light and by causing a post-emission A surface measuring light emitted to and reflected from a portion of a first measurement position on one surface of an object to be measured in the first A surface measuring light to interfere with the second A surface measuring light through optical heterodyne interference, the A surface reference interference light being generated by causing a pre-emission A surface measuring light before emission to the portion of the first measurement position in the first A surface measuring light to interfere with the second A surface measuring light through the optical heterodyne interference, a B surface interference unit that generates a B surface measuring interference light and a B surface reference interference light, the B surface measuring interference light being generated by further branching the B surface measuring light branched by the optical branching device into a first B surface measuring light and a second B surface measuring light and by causing a post-emission B surface measuring light emitted to and reflected from a portion of a second measurement position opposing the portion of the first measurement position on the other surface of the object to be measured in the first B surface measuring light to interfere with the second B surface measuring light through the optical heterodyne interference, the B surface reference interference light being generated by causing a pre-emission B surface measuring light before emission to the portion of the second measurement position in the first B surface measuring light to interfere with the second B surface measuring light through the optical heterodyne interference, and a shape measuring device that obtains a variation in a thickness of the object to be measured based on a first phase obtained by detecting phases of the A surface measuring interference light and the A surface reference interference light generated by the A surface interference unit and a second phase obtained by detecting phases of the B surface measuring interference light and the B surface reference interference light generated by the B surface interference unit. When the optical heterodyne interference is performed, the A surface interference unit and the B surface interference unit make the first A surface measuring light and the second B surface measuring light equal in frequency, and make the first B surface measuring light and the second A surface measuring light equal in frequency. Preferably, the above-described shape measuring apparatus further includes a moving unit that moves the object to be measured in a horizontal direction orthogonal to a thickness direction of the object to be measured, and while a plurality of portions of the first and second measurement positions are being changed by the moving unit moving the object to be measured in the horizontal direction, the shape measuring device obtains the variation in the thickness of the object to be measured on the plurality of portions of the first and second measurement positions. Preferably, in the above-described shape measuring apparatus, the A surface interference unit includes a first A surface optical branching unit that branches the A surface measuring light divided by the optical branching device into the first A surface measuring light and the second A surface measuring light, a first A surface light modulator that modulates the first A surface measuring light branched by the first A surface optical branching unit with a first frequency, a second A surface light modulator that modulates the second A surface measuring light branched by the first A surface optical branching unit with a second frequency different from the first frequency so that the second A surface measuring light is subject to the optical heterodyne interference, a second A surface optical branching device that branches the first A surface measuring light modulated by the first A surface light modulator into a 1-1st A surface modulated measuring light and a 1-2nd A surface modulated measuring light, a third A surface optical branching device that branches the second A surface measuring light modulated by the second A surface light modulator into a 2-1st A surface modulated measuring light and a 2-2nd A surface modulated measuring light, a first A surface interference unit that generates the A surface measuring interference light by causing a post-emission A surface measuring light obtained by emitting and reflecting the 1-1st A surface modulated measuring light branched by the second A surface optical branching device to and from the portion of the first measurement position to interfere with the 2-1st A surface modulated measuring light branched by the third A surface optical branching device, and a second A surface interference unit that generates the A surface reference interference light by causing the 1-2nd A surface modulated measuring light branched by the second A surface optical branching device to interfere with the 2-2nd A surface modulated measuring light branched by the third A surface optical branching device. Further, the B surface interference unit includes a first B surface optical branching device that branches the B surface measuring light branched by the optical branching device into the first B surface measuring light and the second B surface measuring light, a first B surface light modulator that modulates the first B surface measuring light branched by the first B surface optical branching device with a first frequency, a second B surface light modulator that modulates the second B surface measuring light branched by the first B surface optical branching device with a second frequency different from the first frequency so that the optical heterodyne interference is performed, a second B surface optical branching device that branches the first B surface measuring light modulated by the first B surface light modulator into a 1-1st B surface modulated measuring light and a 1-2nd B surface modulated measuring light, a third B surface optical branching device that branches the second B surface measuring light modulated by the second B surface light modulator into a 2-1st B surface modulated measuring light and a 2-2nd B surface modulated measuring light, a first B surface interference unit that generates the B surface measuring interference light by causing a post-emission B surface measuring light obtained by emitting and reflecting the 1-1st B surface modulated measuring light branched by the second B surface optical branching device to and from the portion of the second measurement position to interfere with the 2-1st B surface modulated measuring light branched by the third B surface optical branching device, and a second B surface interference unit that generates the B surface reference interference light by causing the 1-2nd B surface modulated measuring light branched by the second B surface optical branching device to interfere with the 2-2nd B surface modulated measuring light branched by the third B surface optical branching device.

When the optical heterodyne interference is performed, such a shape measuring apparatus makes the first A surface measuring light and the second B surface measuring light equal in frequency and makes the first B surface measuring light and the second A surface measuring light equal in frequency. For this reason, when a variation in the thickness of the object to be measured is obtained based on the first phase and the second phase, noise components included in the first and second phases can be canceled each other. As a result, the shape measuring apparatus can reduce noises.

In the above shape measuring apparatus from another aspect, the shape measuring device obtains a variation in the thickness of the object to be measured based on a difference between the first phase and the second phase.

Since the shape measuring apparatus obtains a variation in the thickness of the object to be measured based on the difference between the first phase and the second phase, a single-phase lock-in amplifier that includes one multiplier and one low-pass filter and in which a phase is represented by an output signal level of the low-pass filter can be used.

In the above shape measuring apparatus from another aspect, the shape measuring device includes an A surface detector that detects light intensity signals of the A surface measuring interference light and the A surface reference interference light in the A surface interference unit, a B surface detector that detects light intensity signals of the B surface measuring interference light and the B surface reference interference light in the B surface interference unit, an A surface lock-in amplifier and a B surface lock-in amplifier that detect phases of a measurement signal and a reference signal, respectively, when a phase difference between the measurement signal and the reference signal is represented by $\theta$ so as to output two output signals of cos $\theta$ and sin $\theta$, respectively, and a thickness arithmetic unit that obtains a variation of the thickness of the object to be measured based on the output signals from the A surface lock-in amplifier and the B surface lock-in amplifier. The A surface lock-in amplifier receives the light intensity signal of the A surface measuring interference light and the light intensity signal of the A surface reference interference light detected by the A surface detector, as the measurement signal and the reference signal. The B surface lock-in amplifier receives the light intensity signal of the B surface measuring interference light and the light intensity signal of the B surface reference interference light detected by the B surface detector, as the measurement signal and the reference signal. The thickness arithmetic unit obtains a variation of the thickness of the object to be measured based on addition of a phase obtained as the first phase based on a result of dividing the output signal of sin $\theta$ by the output signal of cos $\theta$, both the signals being output from the A surface lock-in amplifier and a phase obtained as the second phase based on a result of dividing the output signal of cos $\theta$ by the output signal of sin $\theta$, both the signals being output from the B surface lock-in amplifier, or based on addition of a phase obtained as the first phase based on a result of dividing the output signal of cos $\theta$ by the output signal of sin $\theta$, both the signals being output from the A surface lock-in amplifier and a phase obtained based as the second phase on a result of dividing the output signal of sin $\theta$ by the output signal of cos $\theta$, both the signals being output from the B surface lock-in amplifier.

When the phase difference between the measurement signal and the reference signal is represented by $\phi$, the shape measuring apparatus can obtain a variation in the thickness of the object to be measured through the addition by using the so-called two-phase lock-in amplifier that outputs the two output signals of cos $\theta$ and sin $\theta$ by detecting phases of the measurement signal and the reference signal.

In the shape measuring apparatus from another aspect, the light source unit is a frequency stabilizing gas laser or a semiconductor laser.

As a result, the shape measuring apparatus including a frequency stabilizing helium-neon laser or a semiconductor laser can be provided. Particularly, since the shape measuring apparatus of the present invention makes the first A surface measuring light and the second B surface measuring light equal in frequency and makes the first B surface measuring light and the second A surface measuring light equal in frequency, when obtaining a variation in the thickness of the object to be measured based on the first phase and the second phase, noise components included in the first and second phases can be cancelled each other, and also a fluctuation of the frequency of a laser light can be removed. For this reason, in a case of a semiconductor laser which is lower in the stabilization of a frequency in the laser light than the frequency stabilizing gas laser, the shape measuring apparatus that is approximately equal in a performance to a case using the frequency stabilizing gas laser can be manufactured. Use of the semiconductor laser enables low price, downsizing, and long life of the shape measuring apparatus.

A shape measuring method from another aspect includes branching a measuring light into an A surface measuring light and a B surface measuring light, generating an A surface measuring interference light and an A surface reference interference light, the A surface measuring interference light being generated by further branching the A surface measuring light branched in the branching into a first A surface measuring light and a second A surface measuring light and by causing a first post-emission A surface measuring light emitted to and reflected from a portion of a first measurement position on one surface of an object to be measured in the first A surface measuring light to interfere with the second A surface measuring light through optical heterodyne interference, the A surface reference interference light being generated by causing a first pre-emission A surface measuring light before emission to the portion of the first measurement position in the first A surface measuring light to interfere with the second A surface measuring light through the optical heterodyne interference, generating a B surface measuring interference light and a B surface reference interference light, the B surface measuring interference light being generated by further branching the B surface measuring light branched in the branching into a first B surface measuring light and a second B surface measuring light and by causing a first post-emission B surface measuring light emitted to and reflected from a portion of a second measurement position opposing the portion of the first measurement position on the other surface of the object to be measured in the first B surface measuring light to interfere with the second B surface measuring light through the optical heterodyne interference, the B surface reference interference light being generated by causing a first pre-emission B surface measuring light before emission to the portion of the second measurement position in the first B surface measuring light to interfere with the second B surface measuring light through the optical heterodyne interference, and obtaining a variation in a thickness of the object to be measured based on a first phase obtained by detecting phases of the A surface measuring interference light and the A surface reference interference light that has been generated and a second phase obtained by detecting phases of the B surface measuring interference light and the B surface reference interference light that has been generated. In the generation of the A surface measuring interference light and the A surface reference interference light and the generation of the B surface measuring interference light and the B surface reference interference light, when the optical heterodyne interference is performed, the first A surface measuring light and the second B surface measuring light are made to be equal in frequency, and the first B surface measuring light and the second A surface measuring light are made to be equal in frequency.

In the shape measuring method, when the optical heterodyne interference is performed, the first A surface measuring light and the second B surface measuring light are made to be equal in frequency, and the first B surface measuring light and the second A surface measuring light are made to be equal in frequency. For this reason, when a variation in the thickness of the object to be measured is obtained based on the first phase and the second phase, noise components included in the first and second phases can be canceled each other. As a result, in the shape measuring method, noises can be further reduced.

This application is based on Japanese Patent Application No. 2018-56565 filed on Mar. 23, 2018, the contents of which are incorporated herein by reference.

In order to express the present invention, the present invention has been appropriately and sufficiently described above in the preferred embodiment with reference to the drawings, but a person skilled in the art could have easily changed and/or improved the above-described exemplary embodiment. Therefore, a modified form or an improved form made by the person skilled in the art are interpreted to be covered by the extent of rights of claims unless these forms deviate from the extent of rights of claims described in scope of claims.

What is claimed is:

1. A shape measuring apparatus comprising:
   a light source unit that generates a measuring light;
   an optical branching device that branches the measuring light generated by the light source unit into an A surface measuring light and a B surface measuring light;
   an A surface interference unit that generates an A surface measuring interference light and an A surface reference interference light, the A surface measuring interference light being generated by further branching the A surface measuring light branched by the optical branching device into a first A surface measuring light and a second A surface measuring light and by causing a post-emission A surface measuring light emitted to and reflected from a portion of a first measurement position on one surface of an object to be measured in the first A surface measuring light to interfere with the second A surface measuring light through optical heterodyne interference, the A surface reference interference light being generated by causing a pre-emission A surface measuring light before emission to the portion of the first measurement position in the first A surface measuring light to interfere with the second A surface measuring light through the optical heterodyne interference;
   a B surface interference unit that generates a B surface measuring interference light and a B surface reference interference light, the B surface measuring interference light being generated by further branching the B surface measuring light branched by the optical branching device into a first B surface measuring light and a second B surface measuring light and by causing a post-emission B surface measuring light emitted to and reflected from a portion of a second measurement position opposing the portion of the first measurement position on the other surface of the object to be measured in the first B surface measuring light to interfere with the second B surface measuring light through the optical heterodyne interference, the B surface reference interference light being generated by causing a pre-emission B surface measuring light before emission to the portion of the second measurement position in the first B surface measuring light to interfere with the second B surface measuring light through the optical heterodyne interference; and
   a shape measuring device that obtains a variation in a thickness of the object to be measured based on a first phase obtained by detecting phases of the A surface measuring interference light and the A surface reference interference light generated by the A surface interference unit and a second phase obtained by detecting phases of the B surface measuring interference light and the B surface reference interference light generated by the B surface interference unit,
   wherein when the optical heterodyne interference is performed, the A surface interference unit and the B surface interference unit make the first A surface measuring light and the second B surface measuring light equal in frequency, and make the first B surface measuring light and the second A surface measuring light equal in frequency.

2. The shape measuring apparatus according to claim 1, wherein the shape measuring device obtains the variation in the thickness of the object to be measured based on a difference between the first phase and the second phase.

3. The shape measuring apparatus according to claim 1, wherein the shape measuring device includes
   an A surface detector that detects light intensity signals of the A surface measuring interference light and the A surface reference interference light in the A surface interference unit,
   a B surface detector that detects light intensity signals of the B surface measuring interference light and the B surface reference interference light in the B surface interference unit, an A surface lock-in amplifier and a B surface lock-in amplifier that detect phases of a measurement signal and a reference signal, respectively, when a phase difference between the measurement signal and the reference signal is represented by θ and output two output signals of cos θ and sin θ, respectively, and a thickness arithmetic unit that obtains a variation in the thickness of the object to be measured based on the output signals from the A surface lock-in amplifier and the B surface lock-in amplifier, wherein the A surface lock-in amplifier receives the light intensity signal of the A surface measuring interference light and the light intensity signal of the A surface reference interference light detected by the A surface detector, as the measurement signal and the reference signal, wherein the B surface lock-in amplifier receives the light intensity signal of the B surface measuring interference light and the light intensity signal of the B surface reference interference light detected by the B surface detector, as the measurement signal and the reference signal, and wherein the thickness arithmetic unit obtains a variation in the thickness of the object to be measured based on addition of a phase obtained as the first phase based on a result of dividing the output signal of sin θ by the output signal of cos θ, both the signals being output from the A surface lock-in amplifier, and a phase obtained as the second phase based on a result of dividing the output signal of cos θ by the output signal of sin θ, both the signals being output from the B surface lock-in amplifier, or based on addition of a phase obtained as the first phase based on a result of dividing the output signal of cos θ by the output signal of sin θ, both the signals being output from the A surface lock-in amplifier, and a phase obtained as the second phase based on a result of dividing the output signal of sin θ by the output signal of cos θ, both the signals being output from the B surface lock-in amplifier.

4. The shape measuring apparatus according to claim 1, wherein the light source unit is a frequency stabilizing gas laser or a semiconductor laser.

5. A shape measuring method comprising:

branching a measuring light into an A surface measuring light and a B surface measuring light;

generating an A surface measuring interference light and an A surface reference interference light, the A surface measuring interference light being generated by further branching the A surface measuring light branched in the branching into a first A surface measuring light and a second A surface measuring light and by causing a first post-emission A surface measuring light emitted to and reflected from a portion of a first measurement position on one surface of an object to be measured in the first A surface measuring light to interfere with the second A surface measuring light through optical heterodyne interference, the A surface reference interference light being generated by causing a first pre-emission A surface measuring light before emission to the portion of the first measurement position in the first A surface measuring light to interfere with the second A surface measuring light through the optical heterodyne interference;

generating a B surface measuring interference light and a B surface reference interference light, the B surface measuring interference light being generated by further branching the B surface measuring light branched in the branching into a first B surface measuring light and a second B surface measuring light and by causing a first post-emission B surface measuring light emitted to and reflected from a portion of a second measurement position, opposing the portion of the first measurement position, on the other surface of the object to be measured in the first B surface measuring light to interfere with the second B surface measuring light through the optical heterodyne interference, the B surface reference interference light being generated by causing a first pre-emission B surface measuring light before emission to the portion of the second measurement position in the first B surface measuring light to interfere with the second B surface measuring light through the optical heterodyne interference; and obtaining a variation in a thickness of the object to be measured based on a first phase obtained by detecting phases of the A surface measuring interference light and the A surface reference interference light that has been generated and a second phase obtained by detecting phases of the B surface measuring interference light and the B surface reference interference light that has been generated, wherein in the generation of the A surface measuring interference light and the A surface reference interference light and the generation of the B surface measuring interference light and the B surface reference interference light, when the optical heterodyne interference is performed, the first A surface measuring light and the second B surface measuring light are made to be equal in frequency, and the first B surface measuring light and the second A surface measuring light are made to be equal in frequency.

* * * * *